US012680260B2

(12) United States Patent
Slish

(10) Patent No.: US 12,680,260 B2
(45) Date of Patent: Jul. 14, 2026

(54) FRENCH DRAIN DRAINPIPE

(71) Applicant: IRONX PIPING LLC, Selkirk, NY (US)

(72) Inventor: Richard A. Slish, Selkirk, NY (US)

(73) Assignee: IRONX PIPING LLC, Selkirk, NY (US)

( * ) Notice: Subject to any disclaimer, the term of this patent is extended or adjusted under 35 U.S.C. 154(b) by 209 days.

(21) Appl. No.: 18/665,095

(22) Filed: May 15, 2024

(65) Prior Publication Data

US 2024/0301647 A1 Sep. 12, 2024

Related U.S. Application Data

(63) Continuation-in-part of application No. 17/985,318, filed on Nov. 11, 2022, now Pat. No. 12,012,741.

(51) Int. Cl.

| | |
|---|---|
| ***E02D 31/02*** | (2006.01) |
| ***B08B 3/02*** | (2006.01) |
| ***B08B 9/032*** | (2006.01) |
| ***E02B 11/00*** | (2006.01) |

(52) U.S. Cl.

CPC ................ *E02D 31/02* (2013.01); *B08B 3/02* (2013.01); *B08B 9/0321* (2013.01); *B08B 2209/032* (2013.01); *E02B 11/005* (2013.01)

(58) Field of Classification Search

CPC . E04B 1/7023; B08B 2209/032; B08B 9/032; E03F 3/02; E03F 3/043; F16L 9/19; F16L 9/20; F16L 9/22; E02B 11/005; E02D 31/02

USPC ....................... 405/36, 39–41, 43–45, 47–49

See application file for complete search history.

(56) References Cited

U.S. PATENT DOCUMENTS

| | | | | |
|---|---|---|---|---|
| 2,035,313 | A | 3/1936 | Griffin | |
| 3,936,380 | A | 2/1976 | Boske | |
| 4,596,491 | A | 6/1986 | Dietzler | |
| 6,887,383 | B2 | 5/2005 | Potts | |
| 7,309,423 | B1 | 12/2007 | Branz | |
| 7,909,535 | B2 | 3/2011 | Samara | |
| 8,002,496 | B2 | 8/2011 | Giuffré | |
| 2008/0226393 | A1 | 9/2008 | Leun | |
| 2014/0356066 | A1 * | 12/2014 | Meurer | B01D 24/24 405/43 |

* cited by examiner

*Primary Examiner* — Sunil Singh

(74) *Attorney, Agent, or Firm* — Jong Patent Firm; Cheng Ning Jong; Tracy P. Jong

(57) ABSTRACT

A French drain drainpipe with built-in means for flushing iron ocher out of the drainpipe, out of the perforations, and out of the gravel surrounding the drainpipe. Said means may include chambers for receiving pressurized washing fluids and exit orifices from the chambers. Fittings are provided for connecting the chambers to a pressurized source of washing fluids, such as hose fittings for connecting to a normal household water supply.

11 Claims, 11 Drawing Sheets

FRENCH DRAIN DRAINPIPE

PRIORITY CLAIM AND RELATED APPLICATIONS

This continuation-in-part application claims the benefit of priority from non-provisional application U.S. Ser. No. 17/985,318 filed Nov. 11, 2022. Said application is incorporated by reference in its entirety.

BACKGROUND OF THE INVENTION

1. The Field of the Invention

The present invention relates to an improved perforated pipe for French drain systems.

2. Background Art

A French drain is a trench filled with gravel and having a perforated pipe embedded in the gravel to collect and redirect surface water and groundwater away from an area. French drains are often installed around a building's foundation on the external side of the foundation wall and/or under the basement floor on the internal side to prevent water from penetrating or damaging the foundation. Perforations along the pipe's length allow water to flow into the pipe. The pipe is typically pitched so the inflow water flows down the pipe to a point where it is discharged. The pipe forms an interior channel below the perforations, which channel is continuous, i.e., has continuous unbroken surfaces that confine the inflow water within the channel as it flows to the point of discharge, which discharge is typically through an open end of the pipe.

Over time, iron ocher—an orange-brown gelatinous deposit—may build up in and clog the pipe, pipe perforations and the gravel around the pipe. Iron ocher is a waste byproduct of oxidation of iron in groundwater by bacteria that is naturally occurring in soil.

Clogging from iron ocher can lead to under-performance or failure of the drainage system.

There is a need for a French drain drainpipe adapted for removal of iron ocher. The present invention fulfills these needs by providing means for flushing iron ocher out of the drainpipe, out of the perforations, and out of the gravel surrounding the drainpipe.

SUMMARY OF THE INVENTION

In accordance with the present invention, there is further provided a drainpipe including an elongated member, the elongated member including:

(a) a first conduit disposed on an upper portion of the elongated member, the first conduit including at least one first orifice disposed on a bottom surface of the first conduit;

(b) a pair of second conduits disposed on two sides of the first conduit, each second conduit of the pair of second conduits including at least one second orifice configured to fluidly connect a lumen of each of the second conduits to an environment outside of the elongated member; and (c) a third conduit disposed on a lower portion of the elongated member, the third conduit including two sides and at least one third orifice disposed on each of the two sides of the third conduit, the at least one third orifice configured to receive fluid from the environment outside of the elongated member and the first conduit is configured to be fluidly connected with the third conduit through the at least one first orifice, wherein a first wash fluid is receivable at the first conduit and dischargeable through the at least one first orifice into the third conduit and a second wash fluid is receivable at one or more second conduit of the pair of second conduits and dischargeable through the at least one second orifice to the outside environment before entering the third conduit through the at least one third orifice.

In one embodiment, the elongated member includes two ends and one of the two ends is configured as a tenon and the other one of the two ends is configured as a mortise, the tenon end is configured to be coupled with a mortise end of a second drainpipe and the mortise end is configured to be coupled with a tenon end of a third drainpipe. In one embodiment, the drainpipe further includes a fitting for connecting the first conduit to a source of wash fluid. In one embodiment, the drainpipe further includes a fitting for connecting one of the second conduits to a source of wash fluid. In one embodiment, the at least one second orifice is configured to slope downwardly from the lumen of one of the second conduits to an environment outside of the elongated member. In one embodiment, the upper portion of the elongated member further includes an end wall on one end of the first conduit and the pair of second conduits.

An object of the present invention is to provide a drainpipe having a mechanism useful for facilitating removal of iron ocher which accumulates in or around the drainpipe.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

The subject matter that is regarded as the invention is particularly pointed out and distinctly claimed in the concluding portion of the specification. The invention, however, may be best understood by reference to the following detailed description of various embodiments and the accompanying drawings and photographs in which:

PARTS LIST

1—pipe segment
2—pipe segment
3—pipe segment
4—pipe segment
5—pipe segment
6—pipe segment
11—tenon
12—mortise recess
13—front-end surface
14—back-end surface
15—pipe wall
16—end wall
17—end wall
18—interior peripheral surface
19—conduit surface
20—drainage channel
21—conduit
22—conduit
23—pressure wash orifice
24—pressure wash orifice
25—sidewall perforation
26—interior peripheral surface
30—hose or pipe fitting
31—hose or pipe fitting
32—hose or pipe fitting
33—hose or pipe fitting
34—hose or pipe fitting
35—hose or pipe fitting
36—hose or pipe fitting
37—hose or pipe fitting
41—port

PARTICULAR ADVANTAGES OF THE INVENTION

The present drainpipe enables wash fluid to be supplied to an environment outside of the drainpipe and on both sides of the drainpipe simply by conveying a wash fluid through an aggregate of connected drainpipes without requiring externally and additionally provided conduits that carry a wash fluid for flushing away iron ocher that may accumulate in the gravel adjacent to the drainpipe.

The present drainpipe enables wash fluid to be conveyed through an aggregate of connected drainpipes without requiring an externally and additionally provided conduit for flushing away iron ocher that may accumulate in the drainpipe itself.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
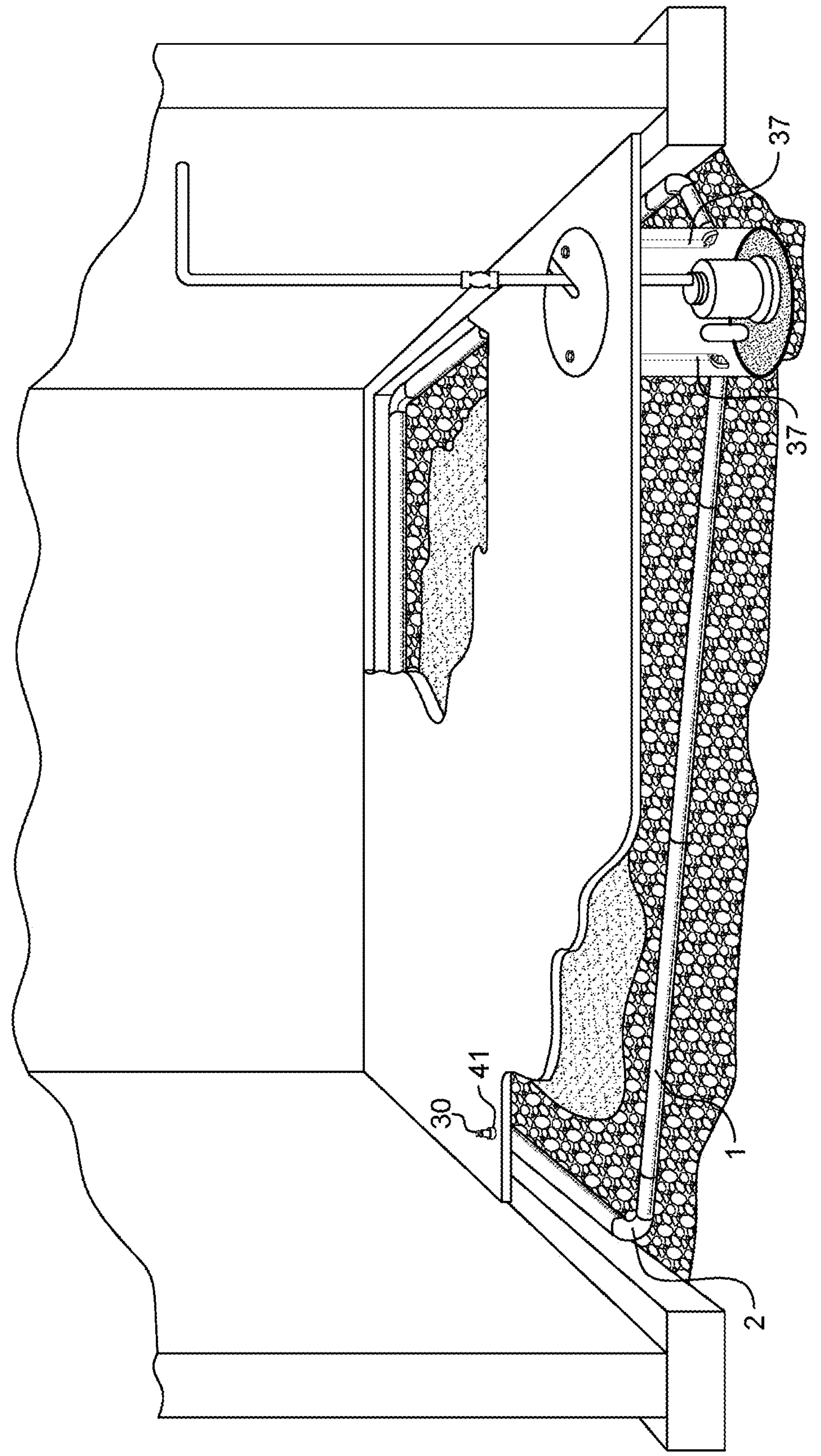
FIG. 1 is a pictorial view of a French drain system of the present invention.

With reference to FIG. 1, a French drain with the perforated pipe of the present invention is shown installed under the basement floor of a building on the internal side the foundation wall. The building may be residential, commercial, industrial, civic, or any other type. The French drain is sloped downward toward the sump pump well. Water may flow into the pipe through sidewall perforations 25 (FIG. 3), down the pipe, and into the sump pump well.

With reference to FIG. 1, the perforated pipe may include pipe segments 1 that are abutted end to end. The drainage system may include one or more ports 41 through the floor and hose fittings 30 through the ports and may further include hose fittings 37 through the sump pump well. The hose fittings may receive a water hose, and provide a connection of the hose to the pipe so that pressurized water from the hose may flush the pipe.

The pressurized water may be from any source, such as a reservoir or tank and under any means of pressure, such as a compressor, pump or natural pressure head, such as a normal household water supply.

Figure 2:
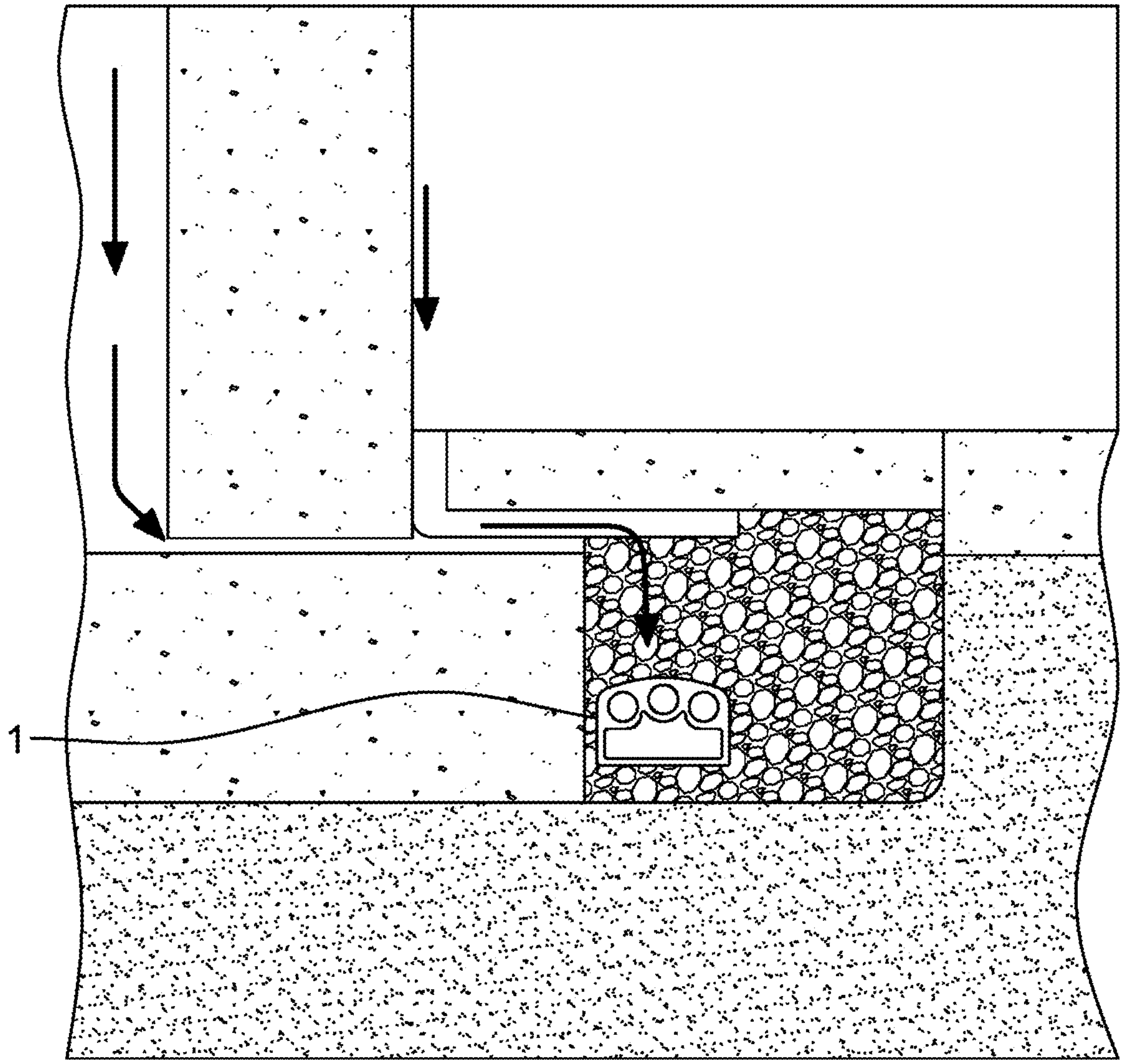
FIG. 2 is a cross-section view of the French drain system of FIG. 1.

With reference to FIG. 2, a cross section of the French drain system of FIG. 1 shows the improved drainpipe of the present invention embedded in the gravel.

With reference to FIGS. 3 and 5-7, the pipe segment or elongated member 1 may have a tenon 11 on one end and a mortise recess 12 on the other end. Adjacent pipe segments may be connected together by inserting the tenon of one pipe segment into the mortise recess of an adjacent pipe segment. A plurality of pipe segments may be connected in series to form long stretches of pipe.

Pipe segment 1 may have an interior drainage channel 20 defined by interior peripheral surface 26 of pipe wall 15. The pipe wall may have one or more perforations 25 therethrough so that water may flow from outside the pipe through the perforations into channel 20. The flow of water into the pipe may be referred to herein as "inflow." Perforations 25 may be at an elevation above the bottom of drainage channel 20 so that below the perforations the channel is continuous and unbroken so that it may confine the water within the channel as it flows towards its discharge through the open end of the pipe. The pipe is preferably pitched with one end of the pipe lower than the other end so that inflow water will flow down the drainage channel towards the low end. The pipe is preferably open ended so water may be discharged through the open end.

Figure 7:
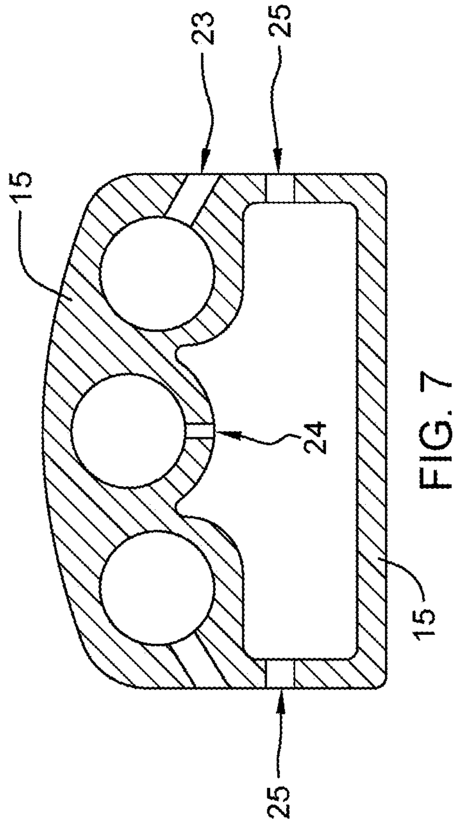
FIG. 7 is a cross-section view on section plane 7-7 of FIG. 6.

The pipe may further include one or more side conduits 22 for receiving pressurized water for flushing iron ocher out of the gravel adjacent to the exterior of the pipe. In a preferred embodiment, conduit 22 is integral to pipe wall 15 and is defined by interior peripheral surface 19 as shown in FIG. 5. Referring to FIGS. 4 and 7, the pipe wall may have one or more pressure wash orifices 23 that extend through the wall from conduit surface 19 of the pipe's lumen to the exterior surface of the pipe that is exposed to the environment outside of the pipe. The orifices 23 provide passageway for pressurized water to flow from conduit 22 to the exterior of the pipe for flushing away iron ocher that may accumulate in the gravel adjacent to the pipe. Preferably, orifice outlets are proximal to perforations 25 so that the discharge of pressurized water washes iron ocher away from areas adjacent to the perforations to keep the perforations free of iron ocher accumulation. In the preferred embodiment of FIGS. 3, 6 and 7, orifices 23 exit the pipe wall above perforations 25 and are sloped downward so that the pressurized water is directed downward towards the gravel adjacent to the perforations, i.e., an environment outside of the pipe segment, e.g., pipe segment 1.

Figure 8:
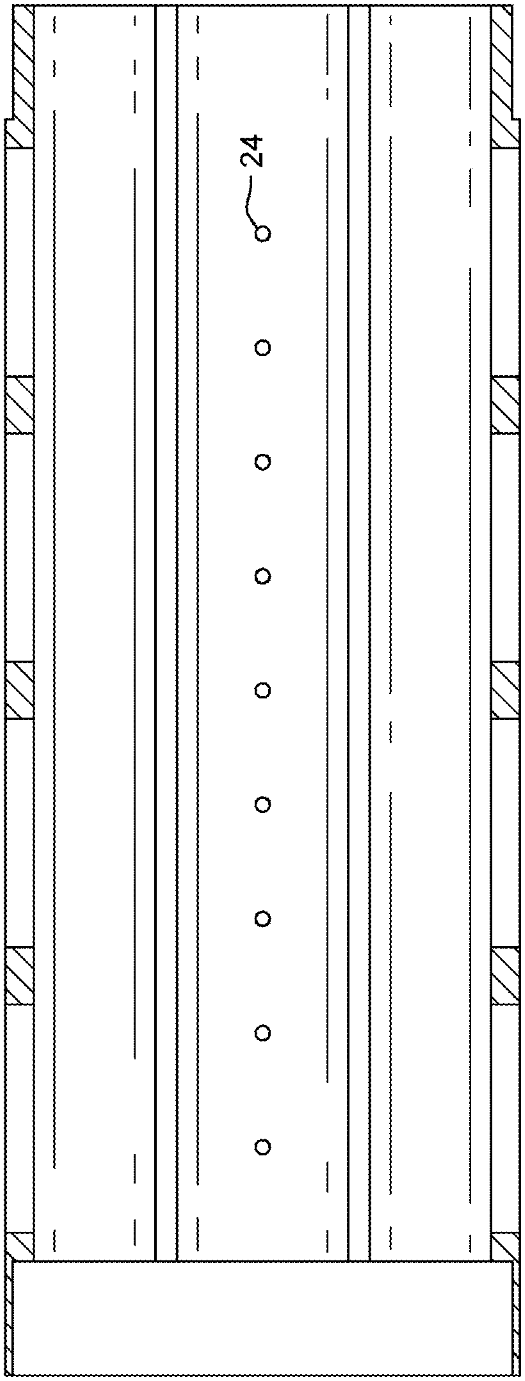
FIG. 8 is a cross-section view on section plane 8-8 of FIG. 6.
Figure 9:
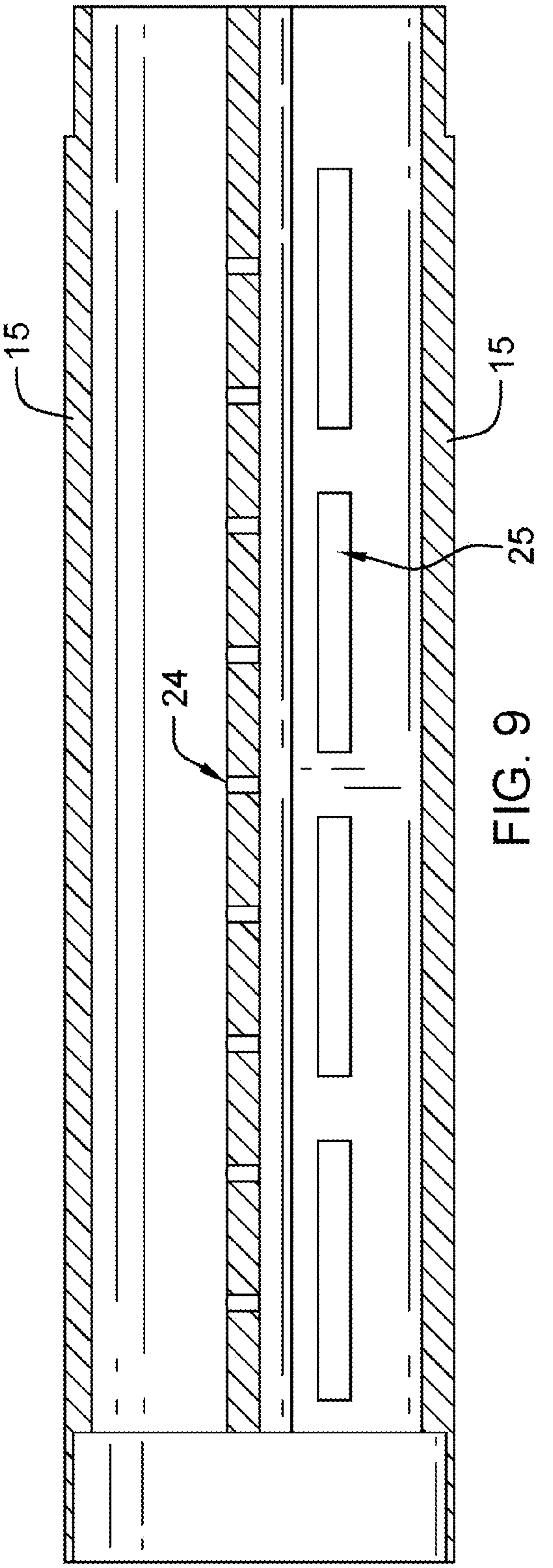
FIG. 9 is a cross-section view on section plane 9-9 of FIG. 5.

With reference to FIGS. 3-8, the pipe may further include one or more inner conduits 21 for receiving pressurized water for flushing iron ocher out of drainage channel 20. In a preferred embodiment, conduit 21 is integral to pipe wall 15 and is defined by interior peripheral surface 18 as shown in FIG. 5. The pipe wall may have one or more pressure wash orifices 24 as shown in FIGS. 7 and 8, that extend through the wall from interior peripheral surface 18 to the interior of wall 15 above channel 20.

The orifices 24 provide passageway for pressurized water to flow from conduit 21 to channel 20 for washing away iron ocher that may accumulate in the channel.

The pipe segments may be of unitary construction including integral conduits and may be manufactured via any suitable means such as injection molding, extrusion molding, 3D printing, machining of a single workpiece, or otherwise. In an alternate embodiment, conduits 21 and 22 may be of separate tubular structure, such as a pipe or hose. The tubular structure may be attached to the pipe and may have outlet orifices through the separate tube wall. The tubular structure may be statically attached to the pipe so that it remains in fixed relation to the pipe.

Whether of unitary construction or separate attached construction, the conduits may be referred to herein as "built-in" conduits.

Figure 3:
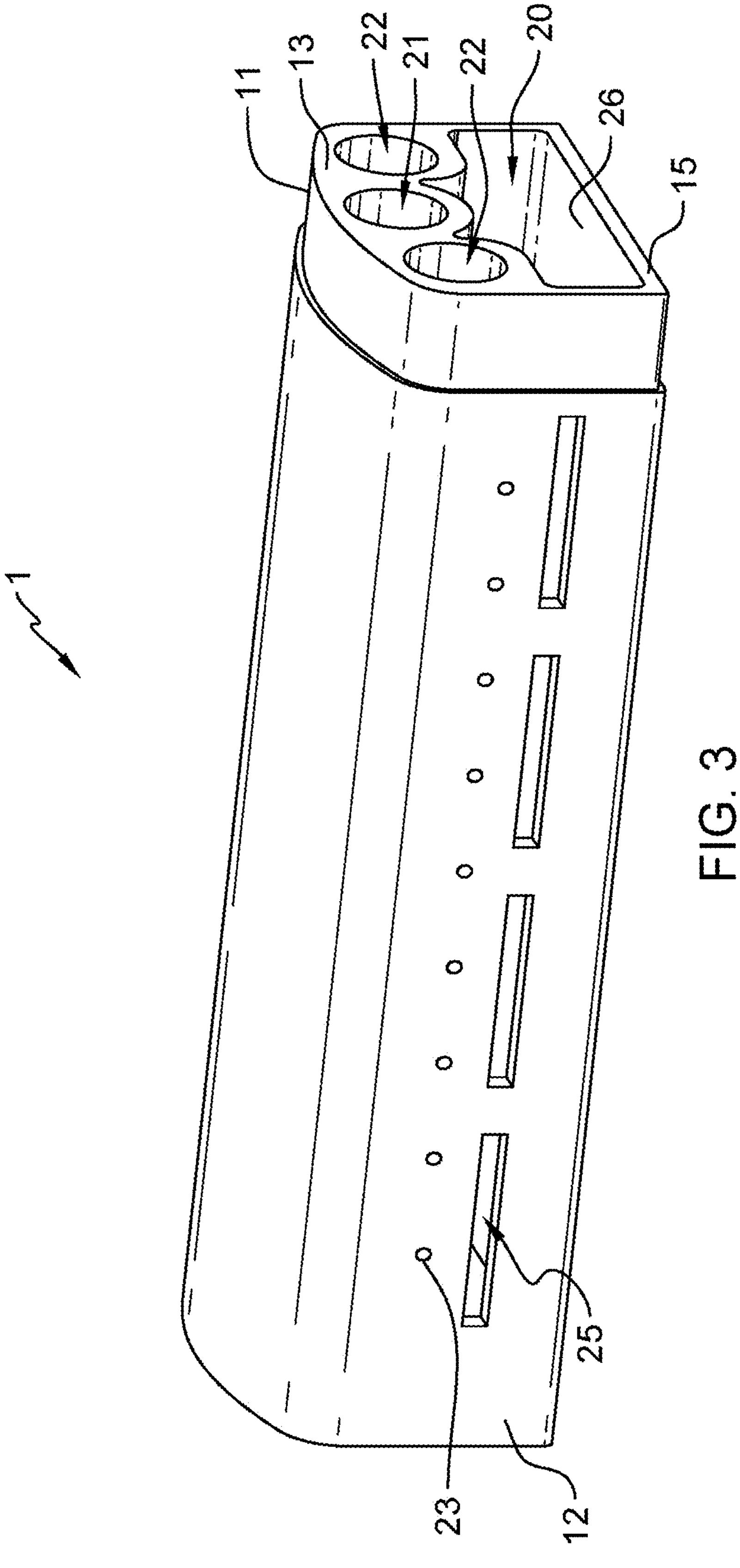
FIG. 3 is a pictorial view of a short straight segment of drainpipe of the present invention showing a male (or tenon) end of the drainpipe segment.
Figure 4:
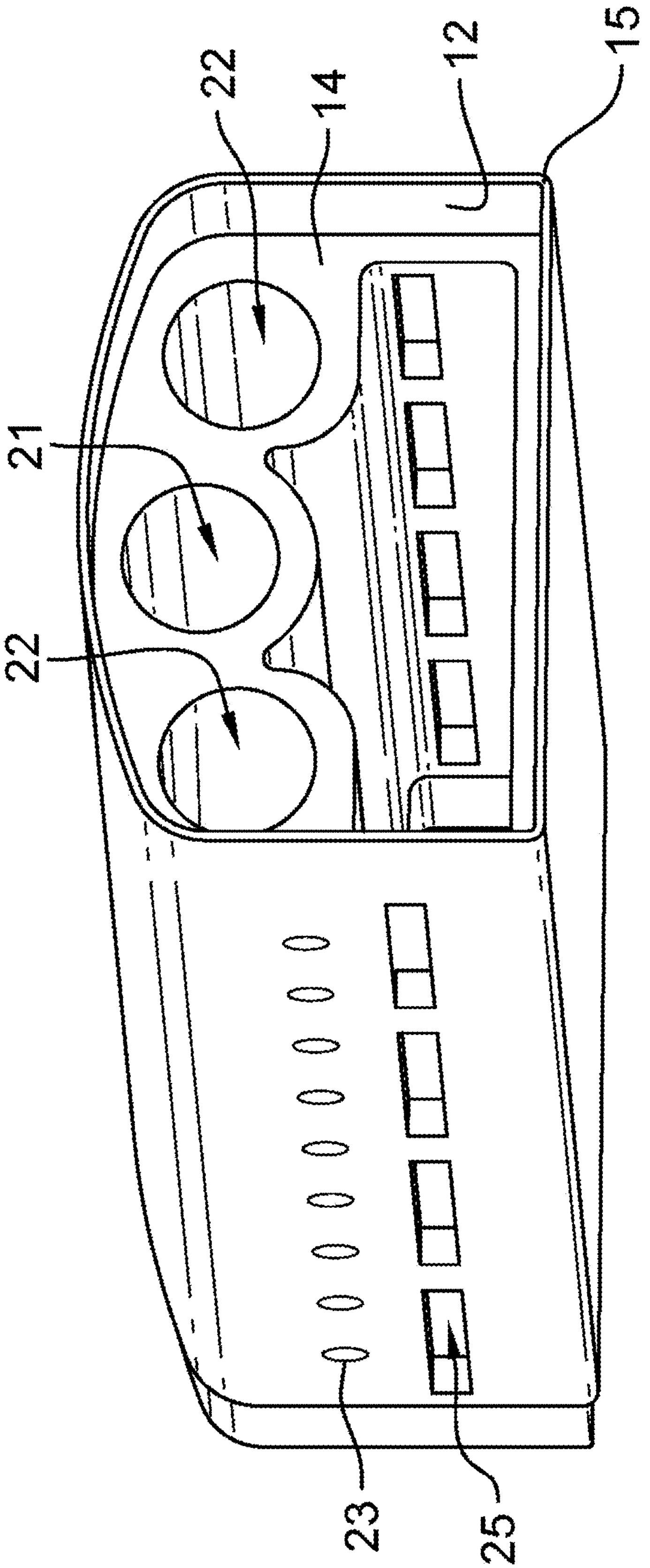
FIG. 4 is a pictorial view of a short straight segment of drainpipe of the present invention showing a female (or mortise) end of the drainpipe segment.
Figure 5:
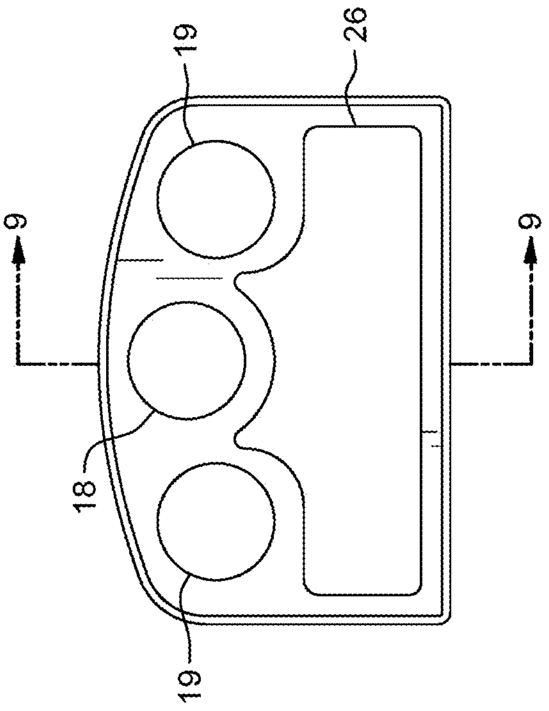
FIG. 5 is an end plan view of the right end of the drainpipe segment of FIG. 3.
Figure 6:
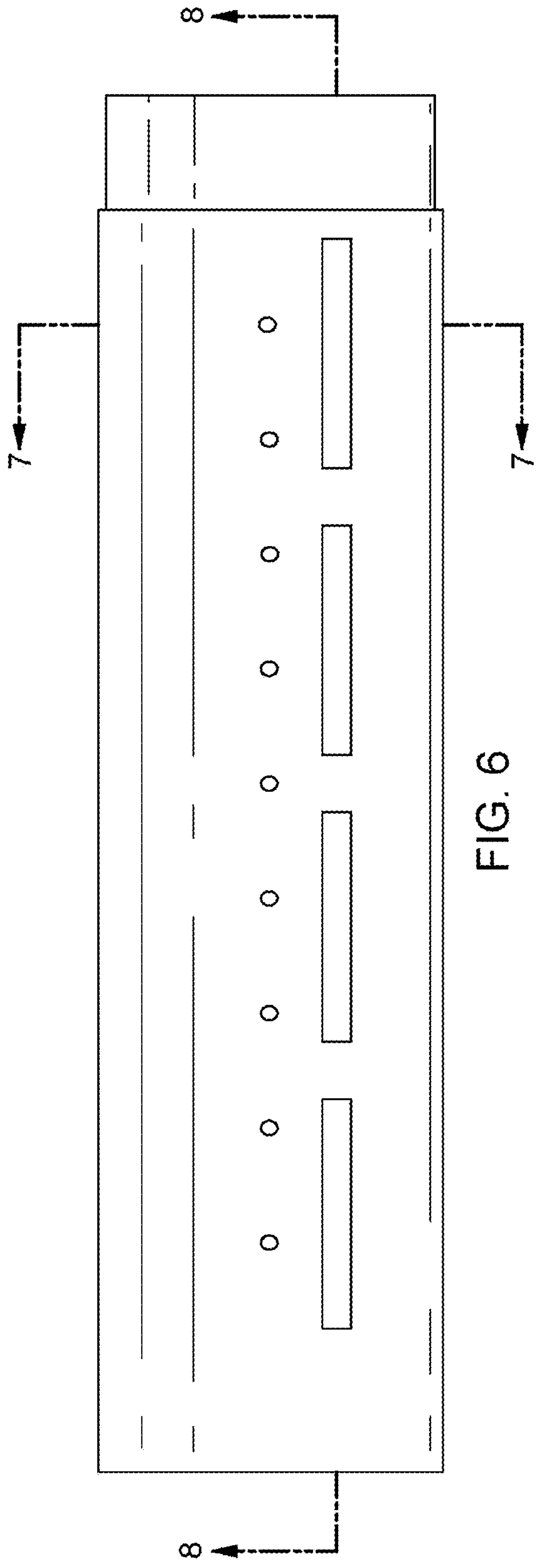
FIG. 6 is a side plan view of the drainpipe segment of FIG. 3.

With reference to FIGS. 1, 3 and 4, the perforated pipe may include a plurality of adjacent pipe segments 1 abutted end-to-end so that front-end surface 13 of tenon 11 of a first segment 1 abuts recessed back-end surface 14 of an adjacent segment 1.

Figure 13:
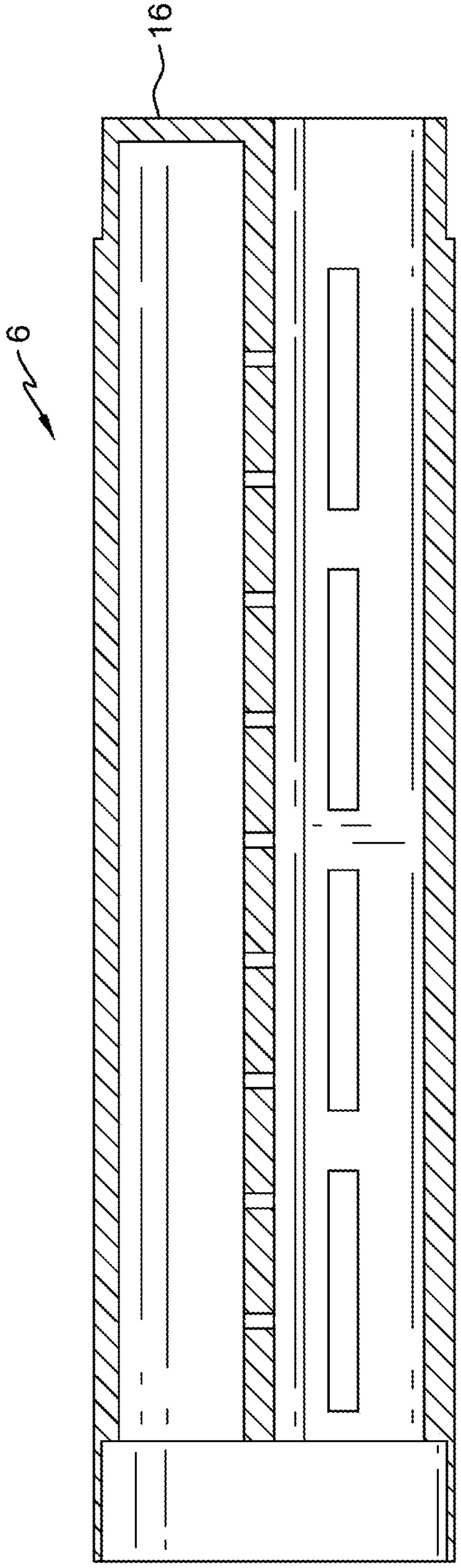
FIG. 13 is an alternate embodiment of the drainpipe segment of FIG. 3 in which the right end of the pressure wash lines are capped off.
Figure 14:
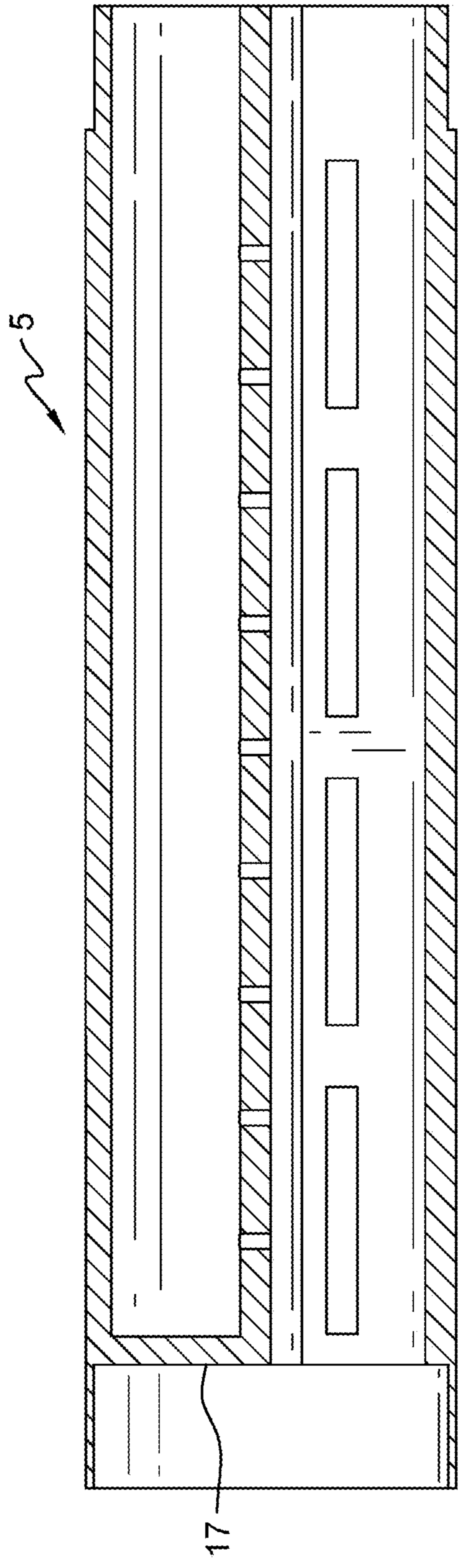
FIG. 14 is an alternate embodiment of the drainpipe segment of FIG. 3 in which the left end of the pressure wash lines are capped off.

With reference to FIG. 13, a pipe segment 6 may be provided with one or more of conduits 21 and 22 closed off at the tenon end with an end wall 16. With reference to FIG. 14, a pipe segment 5 may be provided with one or more of conduits 21 and 22 closed off at the mortise end with an end wall 17.

Figure 12:
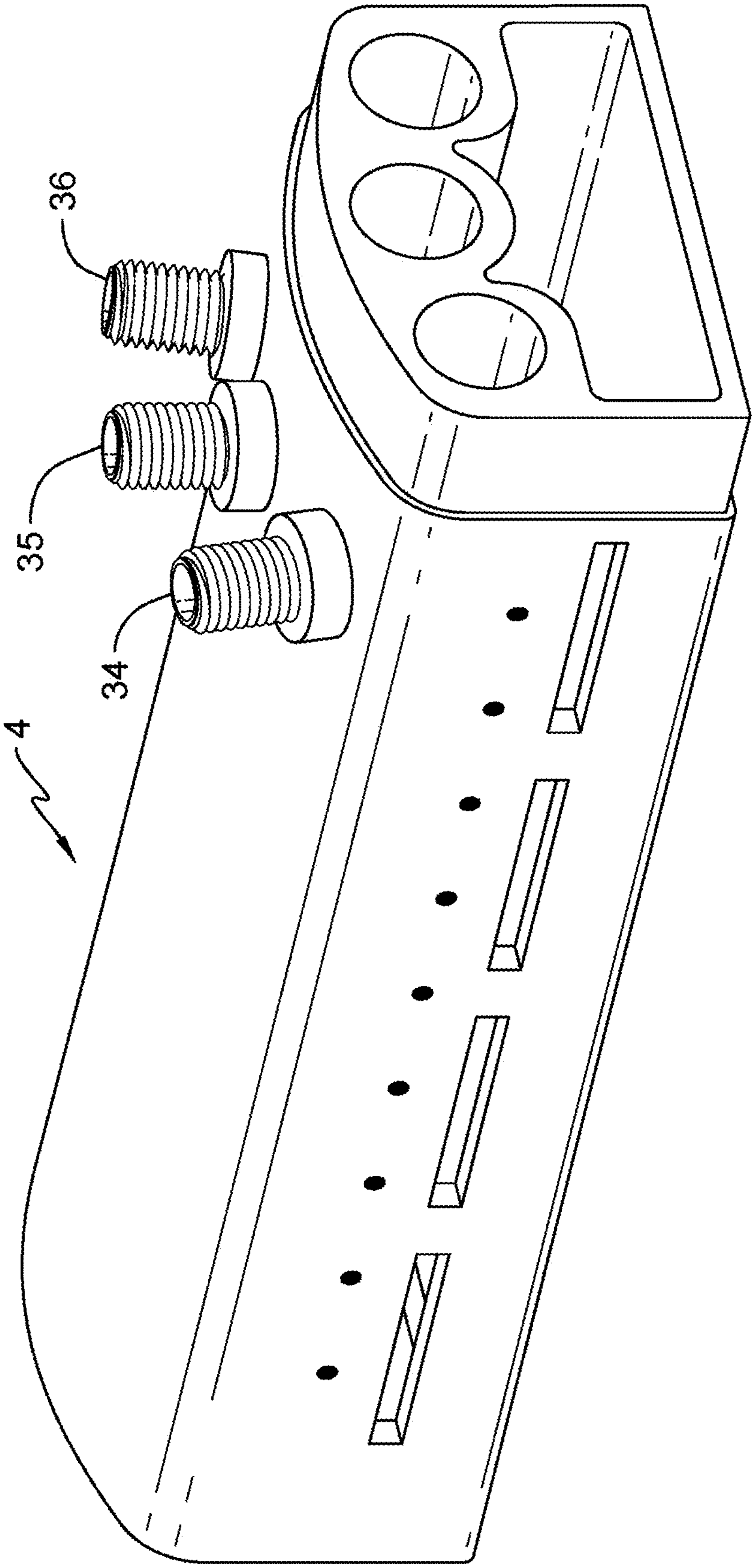
FIG. 12 is the drainpipe segment of FIG. 3 with three hose fittings extending from the top of the drainpipe and communicating with the three pressure wash lines.

In alternate embodiments to those shown in FIGS. 13 and 14, pipe segments 5 and 6 may be provided with hose fittings mid-span of the pipe as shown on pipe segment 4 in FIG. 12.

Figure 11:
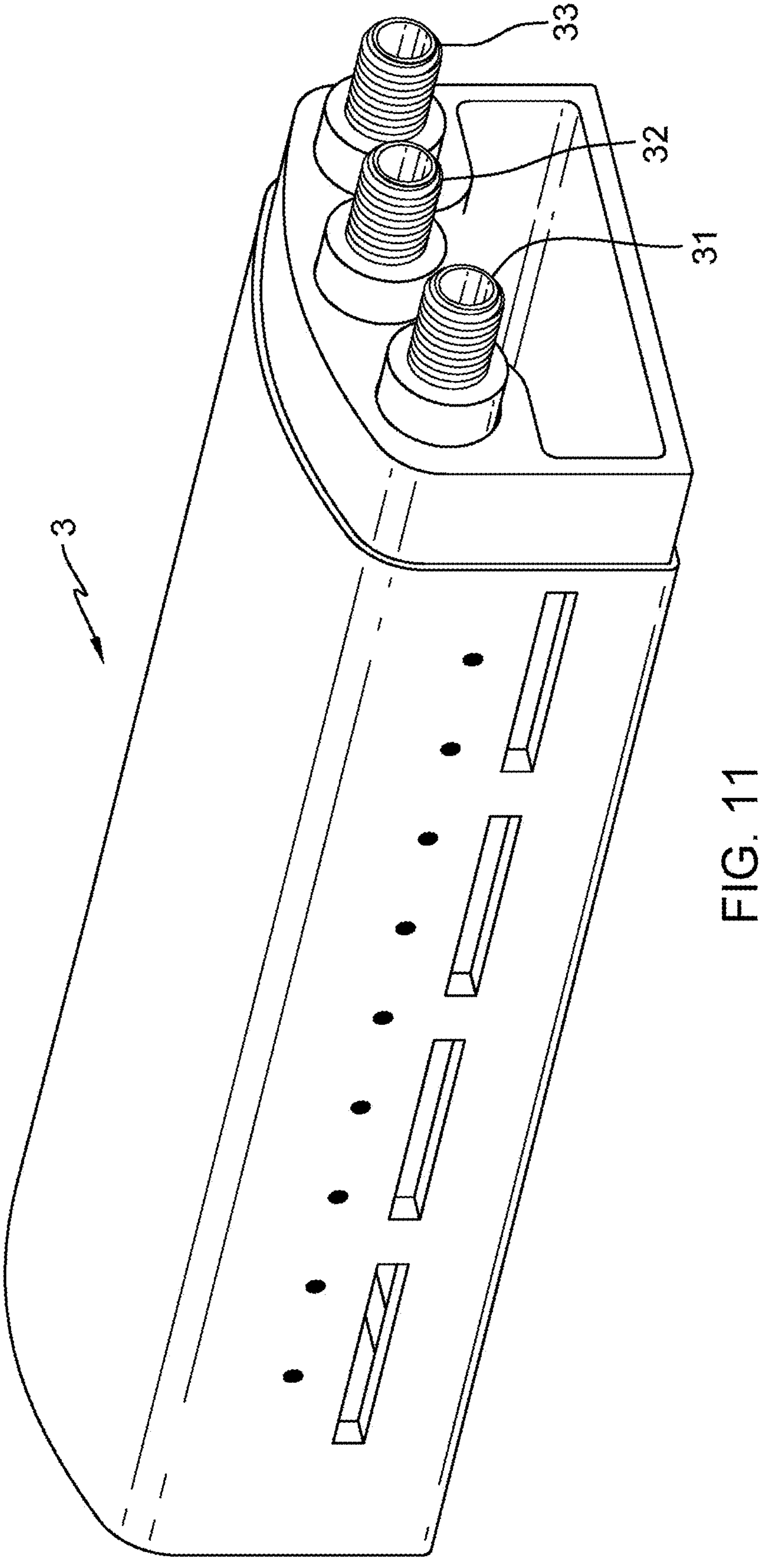
FIG. 11 is the drainpipe segment of FIG. 3 with three hose fittings extending from the end of the drainpipe and communicating with the three pressure wash lines.

Alternatively, or in addition to the mid-span pipe fittings, pipe fittings may be provided on segments 5 and 6 at the mortise end or tenon end as shown on the tenon end of pipe segment 3 in FIG. 11.

Figure 10:
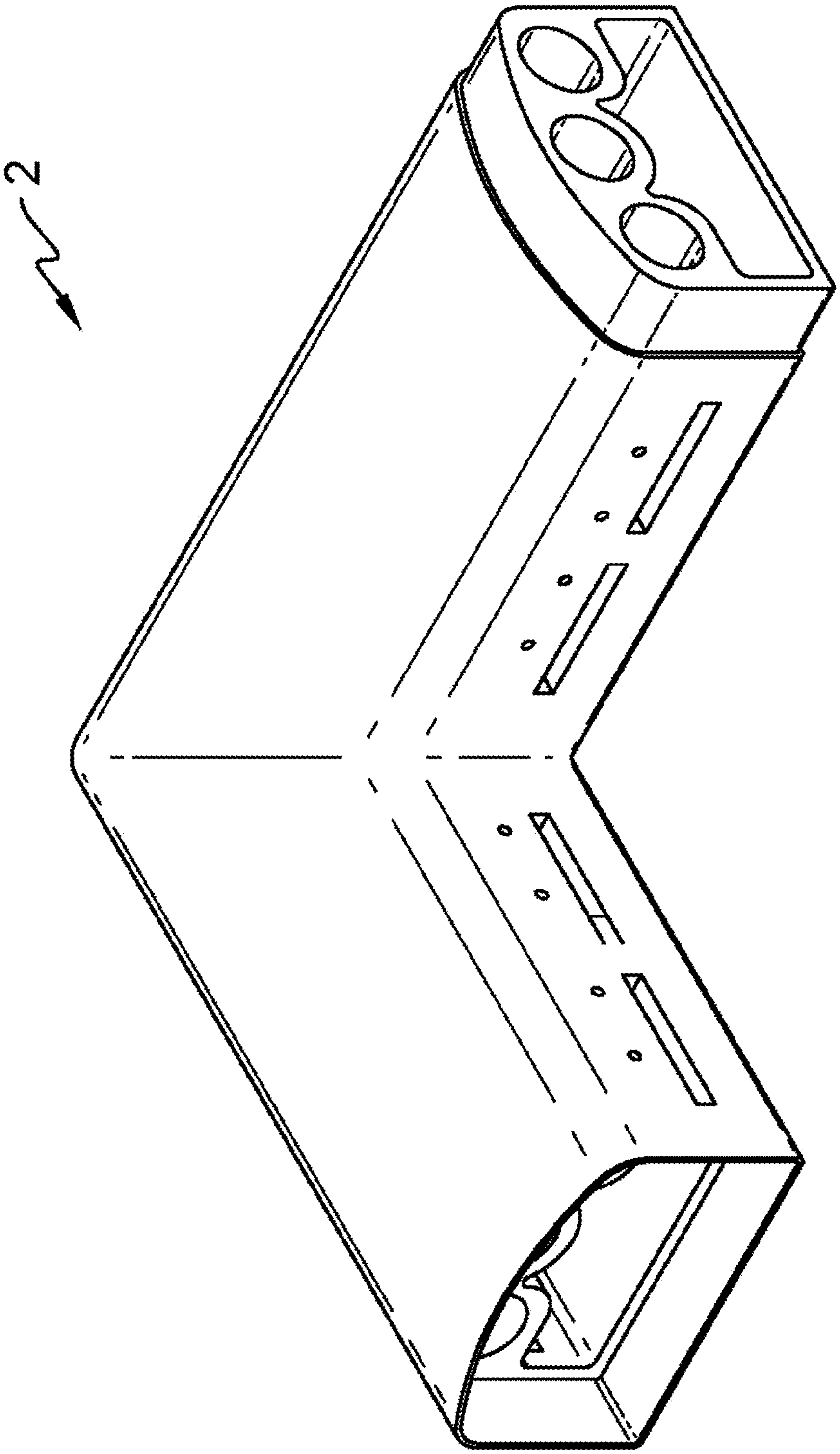
FIG. 10 is a pictorial view of a corner segment of drainpipe of the present invention.

With reference to FIG. 10, pipe segment 2 is shaped in a right angle. Pipe segments may alternatively be provided in any shape. Any pipe segment may be provided with any combination of mid-span hose fittings, end hose fittings, and conduit end-walls. Pipe segments 1, 2, 3, 4, 5 and 6 may be assembled in any sequence. For example, a plurality of pipe segments 1 assembled end-to-end form uninterrupted open-ended drainage channel 20 and uninterrupted open-ended pressure wash conduits 21 and 22 for the length of the assembly. For another example, pipe segments 5, 1 and 6 assembled in that order form uninterrupted open-ended drainage channel 20 and closed-ended pressure wash chamber including conduits 21 and 22 uninterrupted for the length of the assembly except for the closed ends. The closed-ended pressure wash conduits have finite length, and pressurized water introduced into the conduits through the hose fittings will have a finite number of orifices to discharge through. For a given pressure and flow capacity of the pressurized water supply, a fewer number of orifices of a given size may result in greater rate of discharge volume through the orifices, which may result in more effective flushing of iron ocher along the length of the assembly. Pipe segments may be provided at any length and at the same length or different length than any other pipe segment.

The quantity, lengths and varieties of pipe segments assembled together in a French drain system may be chosen from a variety as desired to meet the needs of the drain system and to achieve desired orifice discharge flow rate for flushing away of iron ocher. For example, pipe segments may be chosen to form a series of closed-ended pressure wash chambers of finite length with separate hose fittings provided for each chamber in the series. For another example, pipe segments may be chosen to form uninterrupted open-ended drainage channel 20 and uninterrupted open-ended pressure wash conduits 21 and 22 for the entire length of the assembly, with the conduits being closed only at the ends of the piping assembly.

Flushing away of gelatinous iron ocher external to the drainpipe may be accomplished at low pressure and low flow velocity that will not disturb the stone or gravel surrounding the drainpipe. Additives, such as chemical additives may be added to the water to improve flushing performance.

In alternative to sealing off the ends of conduits with integral end walls like those shown in pipe segments 5 and 6 of FIGS. 13 and 14, separate plugs (not shown) may be provided for insertion into and sealing off open ended conduits of pipe segments 1 and 2 of FIGS. 3-10. Plugs may be used to form a series of closed-ended pressure wash chambers of finite length with segment types selected so that each chamber in the series may have separate hose fittings.

Alternatively, a conduit may be sealed at one end with a wall and at the other with a plug.

In addition to or alternatively to flushing, the improved French drain of the present invention may be used to chemically treat the French drain with chemical additives that may be mixed with fluid and distributed throughout the French drain via the conduits. Such treatments may be performed at much lower water pressure and flow rates than might be used for flushing operations. Flushing, or chemical treatment, or a combination thereof may be used to clean the drainpipe. The present invention may be used for cleaning other materials from within and around the drainpipe, including any materials that may be removed by flushing, chemical treatment, or a combination thereof. The terms "wash fluid" or "washing fluid" as may be used herein to refer to fluid introduced into chambers 21 or 22, under pressure or not under pressure, for discharge interior of the pipe or exterior of the pipe for the purposes of flushing, washing, chemically treating or for other purposes. The purposes may be referred to herein collectively or individually as "washing" or to "wash."

The in-place structure, accessibility, efficiency, affordability, simplicity of operation and other characteristics of the built-in flushing means provided by the improved French drain of the present invention promotes regular flushing and/or chemical treatment of iron ocher from the system and makes the same practical.

While the invention has been particularly shown and described with reference to certain embodiments, it will be understood by those skilled in the art that various changes in form and details may be made to the invention without departing from the spirit and scope of the invention as described in the following claims.

What is claimed herein is:

1. A drainpipe comprising an elongated member, said elongated member comprising:

(a) a first conduit disposed on an upper portion of said elongated member, said first conduit comprising at least one first orifice disposed on a bottom surface of said first conduit;

(b) a pair of second conduits disposed on two sides of said first conduit, each second conduit of said pair of second conduits comprising at least one second orifice configured to fluidly connect a lumen of each said second conduit to an environment outside of said elongated member; and (c) a third conduit disposed on a lower portion of said elongated member, said third conduit comprising two sides and at least one third orifice disposed on each of said two sides of said third conduit, said at least one third orifice configured to receive fluid from the environment outside of said elongated member and said first conduit is configured to be fluidly connected with said third conduit through said at least one first orifice, wherein a first wash fluid is receivable at said first conduit and dischargeable through said at least one first orifice into said third conduit and a second wash fluid is receivable at one or more second conduit of said pair of second conduits and dischargeable through said at least one second orifice to the outside environment before entering said third conduit through said at least one third orifice.

2. The drainpipe of claim 1, wherein said elongated member comprises two ends and one of said two ends is configured as a tenon and the other one of said two ends is configured as a mortise, said tenon end is configured to be coupled with a mortise end of another drainpipe and said mortise end is configured to be coupled with a tenon end of a further drainpipe.

3. The drainpipe of claim 1, further comprising a fitting for connecting said first conduit to a source of the first wash fluid.

4. The drainpipe of claim 1, further comprising a fitting for connecting one of said second conduits to a source of the second wash fluid.

5. The drainpipe of claim 1, wherein said at least one second orifice is configured to slope downwardly from the lumen of one of said second conduits to an environment outside of said elongated member.

6. The drainpipe of claim 1, wherein said upper portion of said elongated member further comprises an end wall on one end of said first conduit and said pair of second conduits.

7. A drainpipe comprising an elongated member, said elongated member comprising:

(a) a first conduit disposed on an upper portion of said elongated member, said first conduit comprising at least one first orifice disposed on a bottom surface of said first conduit;

(b) a pair of second conduits disposed on two sides of said first conduit, each second conduit of said pair of second conduits comprising at least one second orifice configured to fluidly connect a lumen of each said second conduit to an environment outside of said elongated member, wherein said at least one second orifice is configured to slope downwardly from the lumen of one of said second conduits to an environment outside of said elongated member; and (c) a third conduit disposed on a lower portion of said elongated member, said third conduit comprising two sides and at least one third orifice disposed on each of said two sides of said third conduit, said at least one third orifice configured to receive fluid from the environment outside of said elongated member and said first conduit is configured to be fluidly connected with said third conduit through said at least one first orifice, wherein a first wash fluid is receivable at said first conduit and dischargeable through said at least one first orifice into said third conduit and a second wash fluid is receivable at one or more second conduit of said pair of second conduits and dischargeable through said at least one second orifice to the outside environment before entering said third conduit through said at least one third orifice.

8. The drainpipe of claim 7, wherein said elongated member comprises two ends and one of said two ends is configured as a tenon and the other one of said two ends is configured as a mortise, said tenon end is configured to be coupled with a mortise end of another drainpipe and said mortise end is configured to be coupled with a tenon end of a further drainpipe.

9. The drainpipe of claim 7, further comprising a fitting for connecting said first conduit to a source of the first wash fluid.

10. The drainpipe of claim 7, further comprising a fitting for connecting one of said second conduits to a source of the second wash fluid.

11. The drainpipe of claim 7, wherein said upper portion of said elongated member further comprises an end wall on one end of said first conduit and said pair of second conduits.

* * * * *